Dec. 31, 1940.     J. W. PAYNE     2,226,578
KILN
Filed June 14, 1939     3 Sheets-Sheet 1
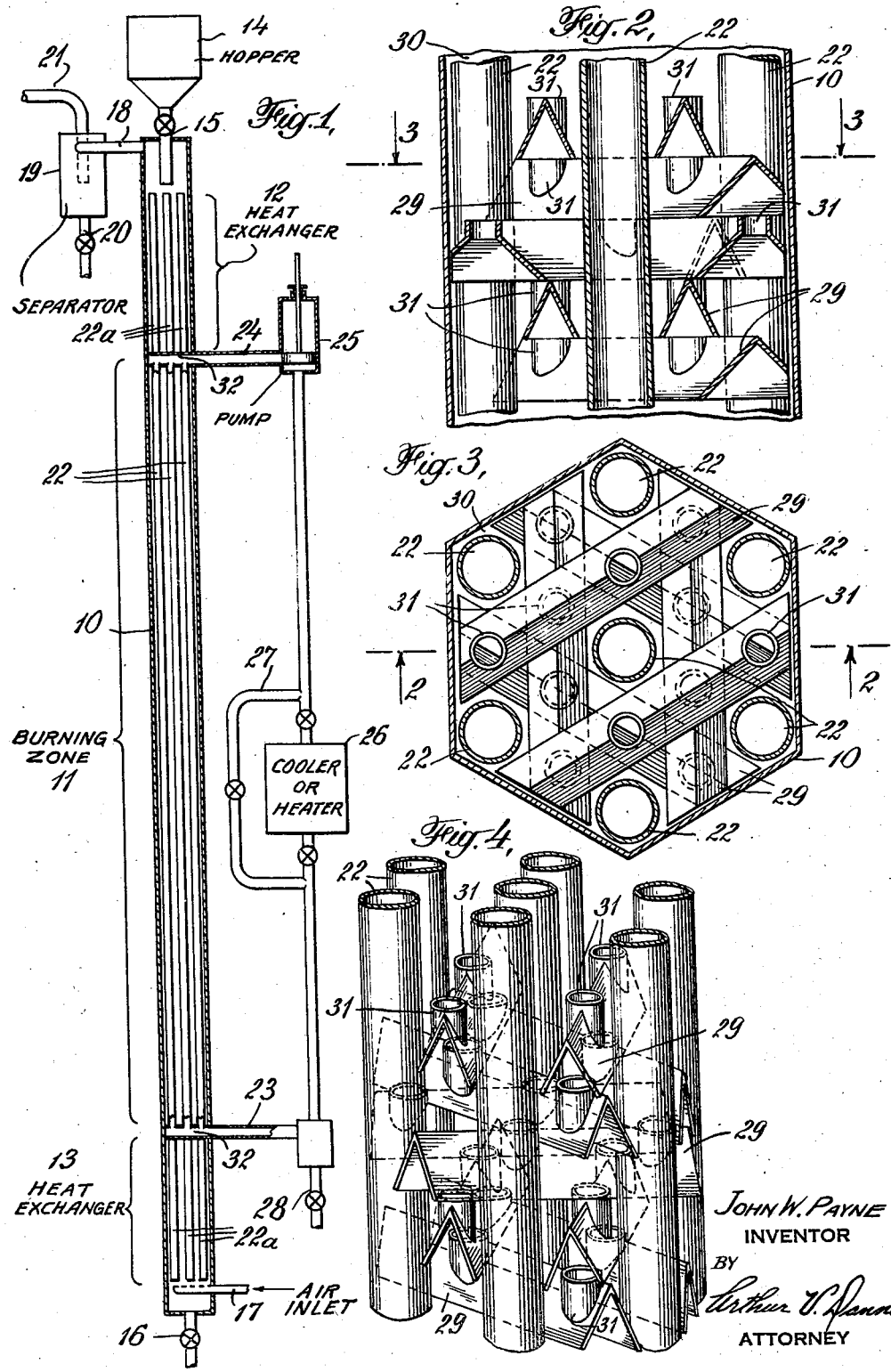
John W. Payne
INVENTOR
BY
Arthur V. Danner
ATTORNEY Dec. 31, 1940. J. W. PAYNE 2,226,578
KILN
Filed June 14, 1939 3 Sheets-Sheet 2
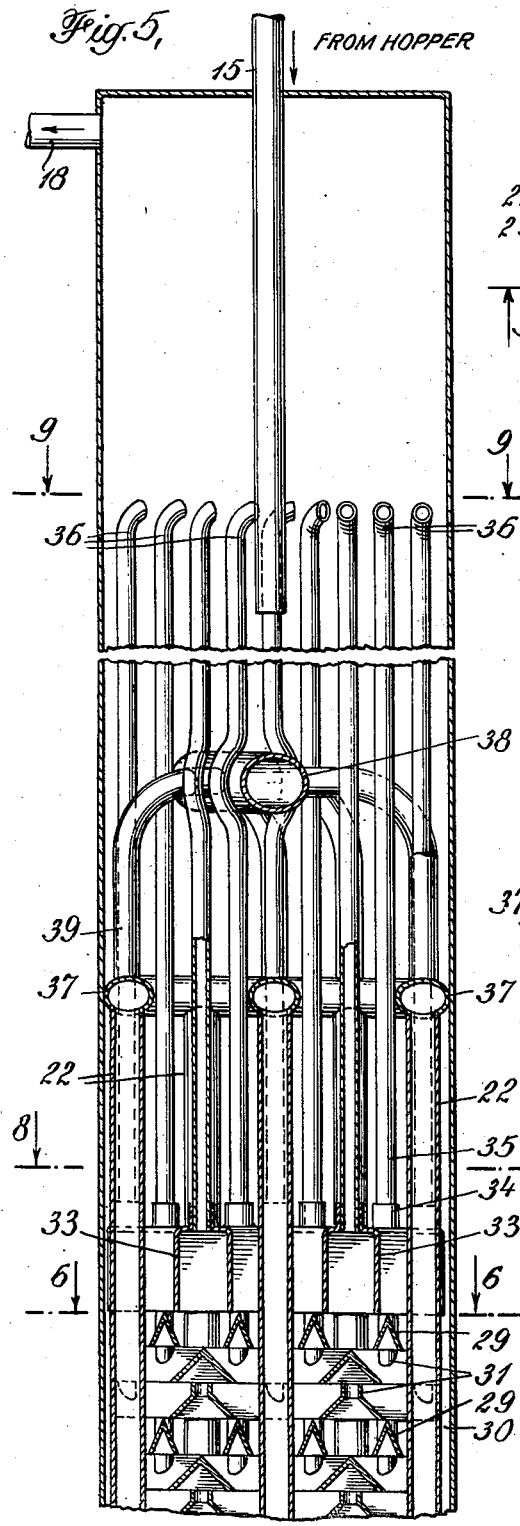
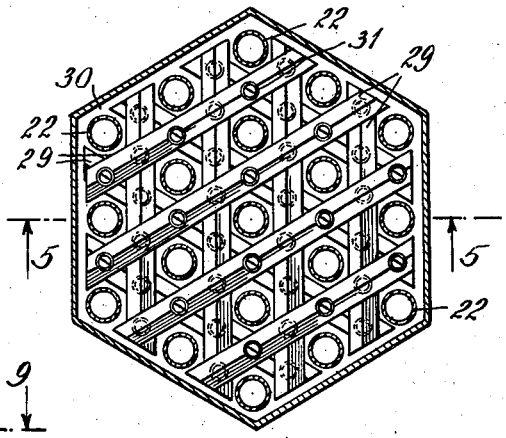
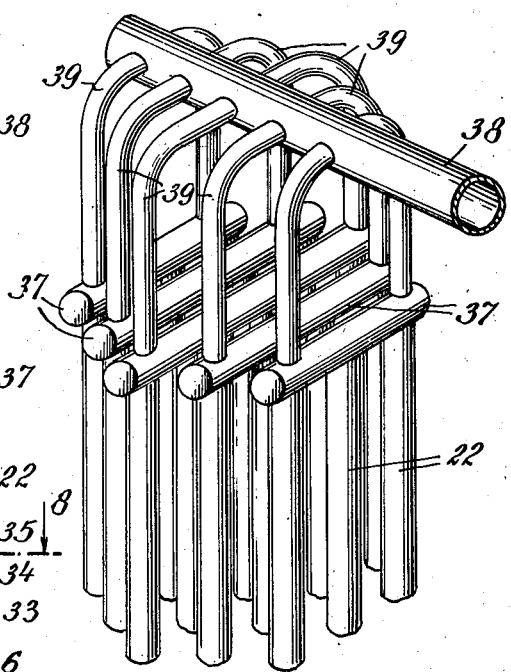
JOHN W. PAYNE
INVENTOR
BY *Arthur V. Danner*
ATTORNEY Dec. 31, 1940.   J. W. PAYNE   2,226,578
KILN
Filed June 14, 1939   3 Sheets-Sheet 3

JOHN W. PAYNE
INVENTOR

BY
ATTORNEY

Patented Dec. 31, 1940

2,226,578

UNITED STATES PATENT OFFICE 2,226,578

KILN

John W. Payne, Woodbury, N. J., assignor to Socony-Vacuum Oil Company, Incorporated, New York, N. Y., a corporation of New York Application June 14, 1939, Serial No. 279,008

12 Claims. (Cl. 202—95)

This invention relates to an apparatus for the treatment of solid granular materials with gases or vapors and/or heat. In particular the invention relates to an apparatus for the regeneration of spent adsorbent materials of the nature of fuller's earth, activated filter clay, bauxite, and the like, which have been used in processes tending to exhaust the utility of the adsorbent by clogging, coating, or impregnating it with liquid or solid materials of an oily, tarry, or carbonaceous nature, and which is regenerated for reuse by the direct application of heat to the spent adsorbent, resulting in a driving off or burning off of the impurity.

Particularly typical of materials to the regeneration of which my invention is applicable are those spent filter clays and adsorbents derived from the filtration of mineral or vegetable oils, sugar liquors, etc. containing adsorbed tarry, oily or carbonaceous matters, which clays or other adsorbents are regenerated for reuse by the heating or burning of the organic material. Another typical material which I may treat is spent adsorbent material derived from some catalytic process of chemical conversion, for example, from catalytic cracking of petroleum hydrocarbons, wherein the adsorbent material constituted the catalyst or acted as a carrier therefor or as a portion thereof, the spent adsorbent being similarly charged with carbonaceous material and being regenerated by burning. Other materials subject to similar regenerations are common and well known in the art.

For convenience the present apparatus will be described in detail with respect to regeneration of filter clay; however, it is to be understood the invention is not limited thereto but is directed to the whole field of regeneration of spent adsorbents by burning of impurities, as well as to the initial preparation of same when necessary, including drying, hardening and the like, by application of heat. Likewise, the present apparatus may be used with advantage for the heat treatment of finely divided solids in general as, for instance, in the roasting of ores, being particularly advantageous for treatments wherein close temperature control is a necessity and reactions are involved which produce or consume a considerable amount of heat.

In regeneration of filter clays as carried out today, the clay suffers a loss in efficiency with each burning or regeneration until finally it cannot be regenerated to a sufficiently high activity to warrant regeneration, at which time the clay is discarded to waste. Since clays which have had a different number of burnings have different efficiencies, they are kept separate and separately classified. In general filter clays are only regenerated about seven or eight times and practically never more than ten to fifteen times before they must be thrown away.

The problem of regenerating clays is complicated by the sensitivity of the clays to high temperatures. While temperatures around 900°-1150° F. are desired to burn off impurities from the clay, temperatures around 1300° F. may permanently injure the clay. Moreover, if the temperature falls too low, inefficient regeneration results. The problem of keeping the temperature of the clay within safe limits is greatly increased since the combustion reaction involved in burning off the impurities evolves considerable amounts of heat and can very easily become so rapid as to get beyond control temporarily, either generally or locally. Probably one of the principal reasons for the successive losses in activity of regenerated clay is the fact a certain amount is overheated or underheated each treatment. In view of the fact most clays to be regenerated have more than enough carbonaceous material deposited thereon to furnish the heat required for regenerating, it is quite probable that present burners in general permit overheating; this appears to be true, moreover, from the fact it would be extremely difficult to control precisely the temperature of all the clay in present burners.

In the past various devices have been devised for carrying out the regeneration of spent clay. One of the first was merely an open hearth upon which the clay was spread and burned. Today there are three principal types of burners in general use. In the first type the clay falls or cascades over baffles set at about a 45° angle through a flue countercurrent to gases of combustion. In the second type the clay is regenerated in a rotary kiln slightly inclined from the horizontal. In the third type, which probably is the most commonly used, multiple hearth burners are employed. These multiple hearth furnaces or burners are substantially the same as used in the roasting of ore and are of either the Nichols-Herreshoff or Wedge type. In these burners the clay is slowly rabbled across each hearth, dropping from one to another until the bottom hearth is reached. In all of these commonly used burners the temperature is controlled principally by adding steam or water, cutting the fires, regulating clay feed rate and regulating the concentration of oxygen passed into the burner and therefore the rate of oxidation.

The kilns or burners which are now in common use are relatively inefficient because of absence of proper temperature control for preventing overburning of clays, comparatively small throughput per unit volume of burner, and inefficient utilization of the heat developed in burning the oil or other carbonaceous matter left on the clay, thus requiring considerable quantities of additional fuel to complete combustion.

Other apparatuses have been proposed but have not displaced the three above-described burners to any appreciable extent. This very fact that other burners have not been taken up by the art is believed conclusive that each one suggested is subject to limitations which prevent regenerations as efficient as, or at least any more efficient than, those already enjoyed by the art. While such a fact is not usually so conclusive, it is believed to be in the present case in view of the tremendous amounts of clay used and thrown away each year and the increased amount that is necessary because of the successive loss in efficiency. Moreover, in view of the fact that clays and like materials are not used in just one industry but in many, with a universal desire existing for improvement, it is believed impossible that any burner which effected any substantial improvement over those now employed could go unnoticed and undeveloped. This view may well be appreciated when it is realized that a single lube oil refinery in the petroleum industry alone may regenerate over 75,000 tons of clay each year.

As a result of my research I have striven to devise an apparatus which would be commercially feasible for handling large quantities of clay and would permit burning off of impurities from the clay at optimum temperature while at the same time affording such constant uniform heating of all the clay under such closely controllable temperature conditions that substantially none of the clay would be subjected to a deleterious temperature. It is believed the improved results I obtain with my present apparatus are largely due to the fact that this apparatus permits burning of clay under substantially these conditions.

It is an object of my invention to provide an apparatus for the heat treatment of finely divided solids which permits uniform temperature control over all the solids passing through the apparatus.

Another object is to provide an apparatus for subjecting finely divided solid material to the action of heat and gases or vapors traveling through said apparatus with the solids and wherein a uniform temperature control may be maintained over all the solids passing through the apparatus.

A more specific object of the invention is to provide an apparatus for subjecting porous adsorptive materials to a heat treatment wherein the adsorptive material is flowed through the apparatus countercurrent to gaseous medium and a uniform temperature control may be maintained over all the adsorptive material passing through the apparatus.

Still another specific object of the invention is to provide a practical apparatus for regenerating spent adsorptive material such as clay and the like having carbonaceous impurities deposited thereon by reacting said carbonaceous impurities with a gaseous oxidizing medium which apparatus permits the adsorptive material to be gravitated at a uniform rate through the apparatus countercurrent to the rising gaseous medium and providing means for controlling the temperature of the adsorptive material such that efficient regeneration will be effected without subjecting the material to deleterious temperatures.

A principal object of this invention is the provision of an apparatus for regeneration of clay wherein accurate control of temperature of regeneration may be obtained readily and positively, achieving maximum regeneration with minimum loss and degradation of adsorbent.

Another object is the provision of an apparatus capable of accomplishing high unit throughput per unit of capital invested and space occupied.

An important object is the provision of an apparatus having few moving parts and capable of easy and effective maintenance.

A further object is the provision of an apparatus which permits more efficient utilization of the heat developed in the apparatus. These and other objects will appear from the following description of my invention.

The present invention comprises a burner or kiln containing a treating zone with means to pass finely divided solids therethrough in intimate contact with and countercurrent to a gaseous medium, the treating zone being provided with baffling means which prevent channeling of the air and solids and permits the use of relatively high air velocities and is provided with temperature control means which maintains a circulating liquid heat exchange medium in indirect heat exchange with said solids while in the treating zone and within sufficiently close proximity to all portions of all solids in said zone that a uniform treatment thereof may be effected without any deleterious temperatures being established at any point in the treating zone.

In order that the invention may be readily understood, reference is now made to the accompanying drawings wherein:

Fig. 1 is a general schematic drawing of a preferred embodiment of my invention;

Fig. 2 is a vertical section of a portion thereof;

Fig. 3 is a plan view on the line 3—3 of Fig. 2;

Fig. 4 is a perspective view of typical interior arrangements within the apparatus;

Fig. 5 is a part elevation in section of a modified form which omits the heat exchanger zones shown in Fig. 1;

Fig. 6 is a plan view on the line 6—6 of Fig. 5;

Fig. 7 is a perspective view of a preferred header structure for the heat transfer tubes of the modified form shown in Fig. 5;

Figure 8:
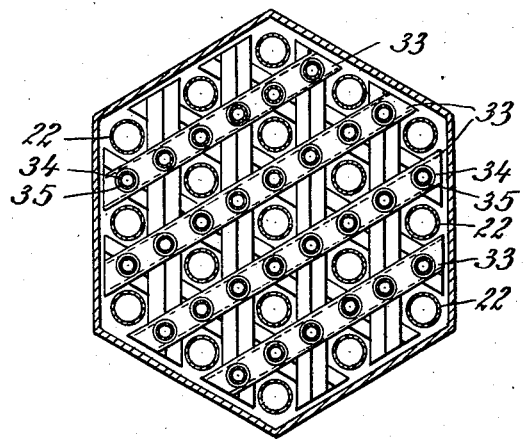
Fig. 8 is a plan view taken on the line 8—8 of Fig. 5.

In Fig. 1, 10 indicates a burner or kiln in which there is housed a burning zone 11, a preheating zone 12, and an after-cooler 13. Spent adsorbent stored in hopper 14 is fed to the upper end of the regeneration apparatus through a throat 15, and thereafter the adsorbent passes downward through zones 12, 11, and 13, and is removed from the apparatus in revivified condition by some device 16, which may preferably be a star wheel mechanism or some similar device for enabling the removal of adsorbent irrespective of the pressure maintained within the casing 10. Air under pressure is fed through inlet 17 and passes upward through the casing 10 in countercurrent relationship to the descending adsorbent, passing successively through zones 13, 11, and 12. The air departs from the apparatus through outlet 18 and is led into separator 19, which is a dust separator preferably of the usual well-known cyclone type wherein fines and dust, if any, are separated from the moving stream of air. These separated materials are removed from or returned to the system through pipe 20 and air or flue gas is finally discharged through pipe 21. It is obvious that these arrangements permit the operation within the case to be carried out at pressures below, near, or materially in excess of atmospheric pressure.

Within the case 10, the functions carried out within the three zones are as follows: In zone 13 incoming air is preheated by contact with burned adsorbent, the adsorbent at the same time being cooled. In zone 11 a combustion occurs in which the carbonaceous impurities are burned from the adsorbent. In zone 12 another heat exchange occurs in which the hot flue gases are cooled and preheat the incoming adsorbent. The rate of flow of air and adsorbent is so adjusted with respect to each other that the supporting effect of the rising column of air does not interefere with the uniform downward flow of the column of adsorbent. Optimum conditions are reached when the velocity of air is quite high and in most cases it appears to be preferable that the velocity of the air is just short of that which will prevent uniform progress of the adsorbent through the apparatus. In the event a combustible material such as bonechar is being regenerated, an inert gas, if any, will replace air and regeneration effected by heat alone. In case other gases are used they may be introduced through air inlet 17 or separate inlets may be provided.

If combustion occurs under the circumstances above outlined in the presence of spent adsorbent containing carbonaceous impurities and air under pressure and in the absence of other agencies, there is a decided tendency to burning in a concentrated zone at extremely high temperatures, ruinous to most adsorbents. In order to control this tendency and suppress it, the burning zone is equipped with heat transfer tubes 22, through which there is circulated a liquid heat transfer medium which enters by pipe 23, leaves by pipe 24, and is circulated under the impulses produced by pump 25. Headers 32 connect pipes 23 and 24 of the external circuit with tubes 22 and are of any suitable construction which permits the clay to gravitate on through the space between the tubes. In order that control of the temperature of this circulating heat transfer medium may be had, there is inserted in the external portion of its circuit a heat exchange means 26 which, dependent upon the requirements of the process being carried out, may be either a cooler or a heater. This heat exchanger 26 is provided with a by-pass 27 to facilitate control of the temperature of the circulating heat transfer medium. To permit addition or withdrawal of heat transfer medium for such purposes, for example, as making up losses or shutting down the system, there is provided a pipe connection 28. Tubes 22a in the heat exchangers 12 and 13 serve merely as spacing tubes for baffles 29.

An important feature of the construction of this apparatus upon which the successful carrying out of the operation is largely dependent, is the internal structure of the regeneration apparatus 10, particularly the structure present within the burning zone 11. To properly carry out the steps of the operation disclosed herein, the adsorbent must pass at a practical rate in one direction and the air in the other direction without either being allowed to channel or flow in a stream by itself without sufficient contact with the other medium. Moreover the elevated temperatures existing in the burning must be closely controlled. To prevent channeling the solids and the gases must be repeatedly admixed with each other. To permit of heat transfer for the control of the combustion, the flowing adsorbent and air must be maintained in close proximity to the heat transfer tubes. It is particularly important that the adsorbent be continuously brought into contact, or close proximity and more or less continuously maintained, in contact or close proximity with these tubes.

Several structural means may be devised whereby the above requirements may be met. For instance, suitably placed tubes for liquid transfer medium provided with welded fins which wind spirally around the tubes. However, a particularly convenient means, one relatively cheap and one which is presently preferred, is that internal arrangement which is shown in the accompanying drawings. In this arrangement, there are shown the vertical heat exchange medium carrying tubes 22, and between those tubes there are shown various short pieces of light angle iron designated 29. These pieces of angle iron are so arranged that their length is placed horizontally and their angle is open downward. Placed in this manner between the heat exchanger tubes 22, each layer of angle irons 29 being disposed transversely to those on the layer below, each angle iron serves to receive the adsorbent descending from above and to distribute that adsorbent laterally in planes at an angle to those planes in which the adsorbent was moving when it first encountered the particular angle iron in question. Also the form and placement of these angle irons and the manner in which they surround the heat exchange tubes 22 causes the adsorbent in its downward flow to repeatedly pass through the annular space 30, which is pointed out in Figure 3, which annular space 30 surrounds the heat transfer medium tube and brings the adsorbent into even closer heat transfer relationship with the heat transfer medium in said tube. Ascending air is trapped beneath each piece of angle iron. To prevent its flow being concentrated at the ends of the angle irons against the walls of the chamber, each angle iron is pierced at several points along its heel forming a series of orifices 31, these orifices being so located that those in one angle iron will be directly below the closed part of the next above angle iron which crosses this part of the first-mentioned angle iron. In this manner each orifice distributes air into the space beneath the angle iron above it, yet air cannot pass directly upward through another orifice. In short, the arrangement is such that these orifices when assembled are not in register. The result of this arrangement is a very effective distribution and re-distribution of both downflowing adsorbent and upflowing air, coupled with an effective bringing of the adsorbent into heat transfer relationship with the heat transfer medium flowing within tubes 22. Furthermore as stated hereinabove the use of relatively high air velocities are desired for practical regeneration. One of the prime features of baffles 29 is that they permit the use of rather high air velocities without blowing the clay or other material out of the apparatus.

Figure 9:
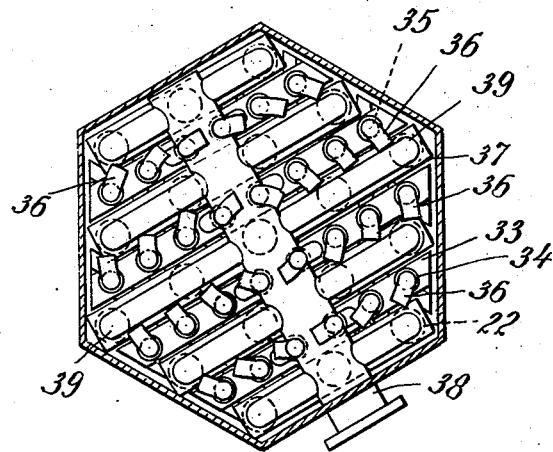
Fig. 9 is a plan view taken on the line 9—9 of Fig. 5.

In Fig. 5, I show part of a modified form which differs from the apparatus of Fig. 1 in omitting the two heat exchanger zones at each end. Since the heat exchanger zones are not absolutely essential for successful operation and since careless operation might permit burning in these zones which are not provided with liquid heat exchange medium, it may be found more practical at times to use this form of my apparatus. In Fig. 5, I also show channel members 33 which are placed transversely across the top row of angle irons covering in row form the orifices 31 opening to the top of the chamber and thereby collecting the rising air (see Figs. 8 and 9). Channel members 33 are provided with orifices 34 to which are attached pipes 35 which lead upwardly to a point above the clay inlet opening of the throat 15 of hopper 14. This latter arrangement prevents the rising air from blowing the newly entering clay, which is above the angle irons, out of the chamber. A further feature of air pipes 35 is shown in Figs. 5 and 9, namely, the curved upper ends 36. Thus the upper ends of all of the air pipes 35 are bent outwardly in such fashion as to force the emerging air to flow in a rotary manner thereby forming a centrifugal separator within the chamber, and, as a consequence of which, the finely divided particles or dust carried by the air are separated out and drop back down while the particle-free air passes on up and out flue 18. It is to be understood, of course, that if desired the air pipes 35 might lead up to the flue or outlet and an external separator used as shown in Fig. 1.

In Fig. 7, I show in detail a preferred header structure which is particularly suitable for an apparatus such as shown in Fig. 5. As shown separate pipes 37, serve as manifolds to connect up rows of heat exchange tube 22. Manifolds 37 are all in turn connected to a single master manifold pipe 38 through curved pipes 39. The master manifold pipe 38 connects with pipe 24 (see Fig. 1) of the external heat transfer medium circuit. A similar header at the bottom of the chamber connects with pipe 23 of the external circuit.

The size of the particles that may be treated in my apparatus is limited by the air velocity required for feasible operation. For this reason the particles treated should be of a granular nature, for instance, 100 mesh or larger, as otherwise trouble will be encountered in obtaining a uniform downward flow of the solids. In practice the apparatus is filled with the granular material which gravitates in a more or less solid column through the apparatus. Accordingly the heat transfer is essentially one of conductance.

As will be obvious from the above description, the operation of the regeneration process is controlled by regulating, in connection with the rate of flow of the adsorbent, first, quantity of air used and, second, the temperature and rate of circulation of the heat transfer medium through the heat transfer tubes.

An important feature of the present invention is the use of liquid heat exchange medium and the structure whereby the solids are intimately contacted with counter flowing gases while each individual particle of the solids, during substantially the entire duration of the reaction, is within sufficiently close proximity to the heat exchange medium that no deleterious temperature condition is created.

The liquid heat exchange medium to be used is preferably one which at the temperatures encountered is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of clay, I prefer the use of fused salts. A particularly preferable mixture of this kind is a mixture of the alkali metal salts of nitric and nitrous acids. By the use of liquid heat exchange medium and by having them in sufficiently close proximity to all particles undergoing reaction an extremely close and uniform temperature control may be maintained.

In the preferred practice the heat exchange medium is maintained at substantially the temperature of the treatment being controlled. Such practice may be carried out because the heat exchange medium is a liquid and has a relatively high specific heat and the structure of the apparatus is such that heat exchange medium is brought within close proximity to every granule in the apparatus. Hence considerable fluctuations in temperature in either direction can be compensated by the liquid heat exchange medium without substantially altering its temperature and if the fluctuation is too great suitable cooling or heating of the heat exchange medium in its circuit will still maintain the liquid at the treating temperature. Thus if a sharp brief rise in temperature occurs which normally would damage the clay before it is indicated, if ever, on a temperature responsive device and suitable manipulation effected to offset the rise, in the present method the liquid heat exchange medium would immediately and automatically offset the rise by absorbing any excess heat so that deleterious temperatures would not be created. Likewise if the temperature fell off sharply so that normally the temperature would go so low that inefficient regeneration would result, this fluctuation likewise would be immediately and automatically offset by the liquid heat exchange medium which would add heat to the cooling granules. Still further, in operation where the clay flows through the apparatus more heat is evolved near the start than near the end of the regeneration when most of the impurities have been removed. Accordingly a heat transfer agent which might cool or heat the initial part of the regeneration properly would not be proper for the final part. However, in this preferred practice proper temperature control is afforded throughout. A further advantage in this practice results from the complicated structure of apparatuses for affording proper temperature control. The structure involves an exposure of tremendous amounts of heat conducting walls. When two widely different temperatures are maintained on different sides of these walls thermal expansion difficulties arise causing buckling, etc. However when substantially the same temperature is maintained throughout, the apparatus operates without strain or difficulty.

As has been indicated hereinabove, one of the important features of the present invention is the construction of an apparatus whereby circulating liquid heat transfer medium may be maintained at all times within sufficiently close proximity to every granule in the burning zone that no deleterious temperatures will be created. Obviously this maximum distance that each granule might be from the liquid heat transfer medium may vary with the materials treated, the atmosphere in the burning zone, the reaction being carried out, the amount of impurities being burned, mass velocity of air, physical properties of the liquid heat transfer medium, etc. Accordingly it would be difficult to specify the maximum distance that may be used for every operation to which my apparatus may be put. However, in general, this distance should not exceed about 1½ to 2 inches in order to afford proper temperature control, a distance of 1½ inches being well suited to the regeneration of clay. Furthermore, it has been found that the volume expressed in cu. in., that may be occupied by the clay or other material should be about ¼ to 3 times the area of heat transfer surface, expressed in sq. in., (exclusive of the angle irons or other baffles). In the regeneration of fuller's earth it is preferred to maintain this ratio within the range of about 1/2 to 3/2.

With the above guides, the concept that the clay or other material is to be passed through a burner of substantial length to afford proper contact time with each particle in sufficiently close proximity to the heat exchange medium that no deleterious temperature will be created at any point and the further concept that the burner is to be provided throughout with baffle means which prevent channeling of the clay and air and also prevent any substantial amount of air from having a "clean sweep" through the apparatus thereby permitting feasible air velocities to be used which do not stop the uniform counter flow of the clay, it is believed any worker in the art will have little trouble in designing the particular apparatus for his uses which incorporates the present invention.

The rate of heat liberation per unit of time per unit of volume is a function of the mass velocity of adsorbent, of the amount of "carbon" to be burned therefrom, and of the mass velocity of the air. Experimentation has established that optimum conditions of burning occur in those ranges of mass velocities wherein the adsorbent is almost supported by the rising air, the upper limit being of course at air velocities so great that adsorbent of the size being burned will not fall, but will float. Since this velocity will vary with the apparent specific gravity of the clay, which apparent specific gravity is a function of the real specific gravity and the particle size, the limiting velocity is not a single velocity, but a range, defined as above. The inter-relation of adsorbent rate, "carbon," and air rate may be expressed best as that combination of rates, which in the case of fuller's earth, for example, while not exceeding about 1150° F. under conditions of operation, will remove carbon at the rate of about 0.1 to about 1.0 pounds per hour per cubic foot of chamber volume for a broad range of possible operation, and from about 0.4 to 0.8 pound per hour per cubic foot of chamber volume for preferred operation. The mass velocity of heat transfer medium of course depends upon the specific heat and other characteristics of the medium. In operations where it is desirable to maintain the adsorbent at a relatively uniform temperature, the mass velocity is best defined as that mass velocity of heat exchange medium which will extract the required amount of heat while undergoing a temperature rise of not greater than about 50° F. and preferably of from 2° to 10° F.

In the above paragraph it is indicated that the temperature of burning should not rise above about 1150° F. That figure is specific to materials of the nature of fuller's earth, and for different materials having different optimum regeneration temperatures, the proper specific temperature should be the basis of design and operation.

To show specific application of the above broad considerations of design, the following examples are given. Both are based upon regeneration of fuller's earth, 30–60 mesh, from percolation filtration of lubricating oil, the clay having been washed, steamed and removed from the filter in the usual manner, containing about 0.5% to 5.0% by weight of "carbon" and up to about 20% by weight of moisture. The dimensional relations are as shown in Table I.

TABLE I

|  | Kiln A | Kiln B |
|---|---|---|
| Length of chamber | 10 feet | 13 feet. |
| Length of burning zone | 8 feet | 10 feet. |
| Length of heat exchange zones (preheated and after-cooler) | 1 foot | 1.5 feet. |
| Size heat transfer tubes | ¼" std. pipe | ¾" std. pipe. |
| Spacing of tubes (triangular) | 1⅛" centers | 2¼" centers. |
| Size of angle irons | 1¹⁄₁₆ x ⁷⁄₁₆ | 1" x 1". |
| Diameter of holes in angles | 0.46" | 0.60". |
| Volume of chamber occupied by clay | 50% | 51%. |
| Hydraulic radius for heat transfer | 0.53" | 0.83". |
| Air clay contact surface (sq. inches/cubic inches clay) | 1.89 | 1.09. |
| Maximum coke burning rate (#/hour/cubic feet of chamber) | 0.60 | 0.61. |
| Maximum clay thruput to burn 3% of coke (#/hour/ft.³ of chamber) | 23 | 19. |
| Pressure drop of air for above rate | 30" water | 19" water. |

Certain items of interest may be noted. The maximum pressure drop for air in designs having about 50% of the volume occupied by clay is about 3 inches of water per foot of chamber when operating near atmospheric pressure. The amount of air used is about 10% or more in excess of that theoretically required. At burning temperatures of about 1000–1050° F. the temperature control is easy and positive and no portion of the clay need rise above 100° F. higher than the temperature of the heat transfer medium.

The gain in filtration efficiency that may be derived from use of my apparatus is marked in amount and its superiority over conventional apparatus is believed best shown by the tabular data set forth in the following Table II, wherein clays burned in my present apparatus are compared in percolation decolorizing efficiency with clay burned in the best type of equipment at present available, the clay being used to exhaustion in percolation prior to each burn and being drained, washed, and strained in the manner usual in the art. (Fresh burned clay was considered as 100% efficient.)

TABLE II

Clays burned in multiple hearth burner

| | Oil stock | F. B., percent efficient | Clay No. | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| | | | Percent | Percent | Percent | Percent | Percent | | | | | | |
| A | Straight | 100 | 80 | 65 | 51 | 44 | 51 | | | | | | |
| | Solution | 100 | 104 | 80 | 64 | 56 | 49 | | | | | | |
| B | Straight | 100 | 94 | | 60 | 60 | 51 | | | | | | |
| | Solution | 100 | 105 | 79 | 84 | 79 | 66 | | | | | | |
| C | Straight | 100 | 88 | 93 | 66 | 55 | 58 | | | | | | |
| D | do | 100 | 106 | 67 | 69 | 45 | 59 | | | | | | |
| E | do | 100 | 85 | 70 | 52 | 50 | 52 | | | | | | |
| F | do | 100 | 115 | 81 | 60 | 65 | 55 | | | | | | |
| Ave | | 100 | 97 | 81 | 63 | 56 | 54 | | | | | | |
| Ave | | | 70 for 5 burns | | | | | | | | | | |

*Clays burned in my apparatus*

| Oil stock | | F. B. percent efficient | Clay No. | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| | | | Percent | Percent | Percent | Percent | Percent | Percent | Percent | Percent | Percent | Percent | Percent |
| A | Straight | 87 | 109 | 87 | ------ | 94 | 65 | 58 | 51 | 65 | ------ | 95 | 65 |
| | Solution | 100 | 80 | 83 | ------ | 88 | 88 | 76 | 72 | 68 | ------ | 68 | 86 |
| B | Straight | 94 | 102 | 94 | 94 | 85 | 60 | 68 | ------ | ------ | ------ | 77 | 60 |
| | Solution | 100 | 131 | 100 | ------ | 125 | 120 | 124 | 114 | 105 | ------ | 94 | 96 |
| C | Straight | ------ | ------ | 80 | 96 | 91 | 101 | 99 | 96 | 91 | ------ | 83 | 80 |
| D | do | 94 | 134 | 111 | 87 | 86 | 79 | 73 | 71 | 69 | ------ | 63 | 72 |
| E | do | 94 | 104 | ------ | 78 | ------ | 73 | 70 | 64 | 56 | ------ | 50 | 50 |
| F | do | 129 | 114 | 86 | 105 | 86 | 81 | 76 | 76 | 71 | ------ | 81 | 67 |
| Ave | | 100 | 110 | 92 | 92 | 93 | 83 | 80 | 78 | 75 | *75 | 76 | 74 |
| Ave | | 84 for 11 burns | | | | | | | | | | | |

* Estimated average.
Solutions consisted of 60 percent (vol.) of oil and 40 percent (vol.) naphtha. Yields based on oil component.

Thus it will be seen from the above table that a very decided improvement is obtained by the use of my apparatus, i. e., the efficiency of the clay regenerated in my apparatus is substantially higher than clay which has been regenerated the same number of times in conventional kilns. It will be noted the decolorizing efficiency of clay after five regenerations in the multiple hearth burner is reduced to about 55% of that of fresh burned (new) clay. The average efficiency of No. 1 to No. 5 clays is about 70% on the same basis. However starting with fresh clay and conducting regenerations in my apparatus, the efficiency of clay after even eleven regenerations is still above 75% and the average efficiency of No. 1 to No. 11 clays is about 84%. Thus after eleven regenerations in my apparatus the clay has a higher efficiency than clay which has received only five regenerations in a multiple hearth kiln. It will also be noted that in some instances, and particularly with my apparatus, the efficiency of a regenerated clay is above 100%. The probable reason for this is because the particular fresh burned clay was not initially prepared most efficiently and when carefully regenerated with proper control throughout the regenerated clay in its early burns was more efficient than when freshly prepared.

In addition to the important advantage of positive temperature control whereby clay is reactivated to higher efficiency than that obtained in present burner as set forth above, the present apparatus has several other distinct advantages over the commonly used burners. Not the least of these advantages is the fact higher throughput of clay per unit volume of burner is possible. I have varied the rate of clay throughput in my apparatus from 16 lbs./hr./cu. ft. of kiln volume to 50 lbs./hr./cu. ft. of kiln volume without any marked effect on the degree of reactivation. In certain cases the throughput is 15 to 20 times that of present multiple hearth burners. Quite obviously a distinct improvement is afforded by this increased throughput rate in substantially reducing the time required to regenerate large batches of clay. The following data clearly demonstrates this advantage on clays of equal carbonaceous content.

| Applicant's burner | | Nichols-Herreshoff burner | |
|---|---|---|---|
| Clay feed rates, lbs./cu. ft./hr. | Effective burning surface, sq. ft./cu. ft. | Clay rate, lbs./1 cu. ft./hr. | Effective burning surface, sq. ft./cu. ft. |
| 20.0 | 5.2 | 0.6 | .15 |

A further advantage of the present apparatus is the fact there are no moving parts except the pump for circulating the heat exchange medium. This not only makes construction and operation much simpler but considerably reduces the expense as compared, for example, to the commonly used multiple hearth burners wherein the rabble arms are rotated.

Another important feature of the present invention is the efficient utilization of the heat developed in burning. Since more heat is developed by burning most clays than is required this excess heat is absorbed by the liquid heat exchange medium and may be utilized for other purposes by heating other materials through heat exchange with the liquid heat exchange medium and thereby also properly controlling its temperature. On the other hand the utilization of the heat developed by burning in the commonly used burners such as the Wedge type multiple hearth is so poor due to loss to surroundings, etc., that additional fuel is added, the cost of this additional fuel for one average size refinery alone may be as high as $20,000 per year.

This application is a continuation-in-part of my copending application Serial No. 210,150, filed May 26, 1938.

I claim:

1. Apparatus for reacting granular material with a gaseous agent at closely controlled elevated temperatures comprising a chamber so constructed that said granular material may be gravitated through said chamber during reaction, said chamber being of sufficient length in the direction of flow to permit proper reacting time, means to flow said gaseous agent countercurrently through said chamber in direct contact with said granules, a plurality of tubular members positioned within said chamber and adapted to carry a circulating liquid heat transfer medium in indirect heat transfer relationship with said granules, the structure and positioning of said tubular members being such that each granule during its entire reaction period is within sufficiently close proximity to at least one of said tubular members that the temperature of all granules may be maintained within a suitable reaction temperature range while preventing any deleterious temperature being created at any point within said chamber, means to circulate liquid heat transfer medium through said tubular members, baffle means within said chamber for redistributing the granules and gaseous agent throughout the reaction period and which forces the gaseous agent to take a circuitous route through said chamber, said baffle means comprising layers of angle irons positioned between said tubular members with their angles opening downwardly, the angle irons of each layer being transverse to those of adjoining layers, each of said angle irons having a series of orifices along its heel and said orifices being so located that in any angle iron they will be directly below the closed part of the next above angle iron crossing thereover.

2. Apparatus for regenerating granular filtering material such as clays and the like with a gaseous regenerating agent at closely controlled elevated temperatures comprising a chamber so constructed that said granular material may be gravitated through said chamber during regeneration, said chamber being of sufficient length in the direction of flow to permit proper regenerating time, means to flow said gaseous agent countercurrently through said chamber in direct contact with said granules, a plurality of tubular members positioned within said chamber and adapted to carry a circulating liquid heat transfer medium in indirect heat transfer relationship with said granules, the structure and positioning of said tubular members being such that each granule during its entire regenerating period is within sufficiently close proximity to at least one of said tubular members that the temperature of all granules may be maintained within a suitable regenerating temperature range while preventing any deleterious temperature being created at any point within said chamber, means to circulate liquid heat transfer medium through said tubular members, means to maintain liquid heat transfer medium in said tubular members at substantially the desired regeneration temperature, baffle means within said chamber for redistributing the granules and gaseous agent throughout the regeneration period and which forces the gaseous agent to take a circuitous route through said chamber, said baffle means comprising layers of angle irons positioned between said tubular members with their angles opening downwardly, the angle irons of each layer being transverse to those of adjoining layers, each of said angle irons having a series of orifices along its heel and said orifices being so located that in any angle iron they will be directly below the closed part of the next above angle iron crossing thereover.

3. Apparatus for regenerating granular petroleum filtering material such as clays and the like with a gaseous regenerating agent at closely controlled elevated temperatures comprising a chamber so constructed that said granular material may be gravitated through said chamber during regeneration, said chamber being of sufficient length in the direction of flow to permit proper regenerating time, means to flow said gaseous agent countercurrently through said chamber in intimate contact with said granules, a plurality of tubular members positioned within said chamber and adapted to carry a circulating molten salt heat transfer medium in indirect heat transfer relationship with said granules, the structure and positioning of said tubular members being such that each granule during its entire regenerating period is not more than about 1½ inches from at least one of said tubular members whereby the temperature of all granules may be maintained within a suitable regenerating temperature range while preventing any deleterious temperature being created at any point within said chamber, means to circulate molten salt heat transfer medium through said tubular members, means to maintain molten salt heat transfer medium in said tubular members at substantially the desired regeneration temperature, baffle means within said chamber for redistributing the granules and gaseous agent throughout the regeneration period and which forces the gaseous agent to take a circuitous route through said chamber, said baffle means comprising layers of angle irons positioned between said tubular members with their angles opening downwardly, the angle irons of each layer being transverse to those of adjoining layers, each of said angle irons having a series of orifices along its heel and said orifices being so located that in any angle iron they will be directly below the closed part of the next above angle iron crossing thereover.

4. Apparatus for regenerating granular petroleum filtering material such as clays and the like with a gaseous regenerating agent at closely controlled elevated temperatures comprising a chamber so constructed that said granular material may be gravitated through said chamber during regeneration, said chamber being of sufficient length in the direction of flow to permit proper regenerating time, means to flow said gaseous agent countercurrently through said chamber in direct contact with said granules, a plurality of tubular members positioned within said chamber and adapted to carry a circulating molten salt heat transfer medium in indirect heat transfer relationship with said granules, the structure and positioning of said tubular members being such that each granule during its entire regenerating period is not more than about 1½ inches from at least one of said tubular members whereby the temperature of all granules may be maintained within a suitable regenerating temperature range while preventing any deleterious temperature being created at any point within said chamber, means to circulate molten salt heat transfer medium through said tubular members, means to maintain molten salt heat transfer medium in said tubular member is at substantially the desired regeneration temperature, baffle means within said chamber for redistributing the granules and gaseous agent throughout the regeneration period and which forces the gaseous agent to take a circuitous route through said chamber, said baffle means comprising layers of angle irons positioned between said tubular members with their angles opening downwardly, the angle irons of each layer being transverse to those of adjoining layers, each of said angle irons having a series of orifices along its heel, said orifices being so located that in any angle iron they will be directly below the closed part of the next above angle iron crossing thereover, means to collect the gaseous agent leaving the top of said baffle means and pipe conducting means for conducting said gaseous agent to a point in the chamber above where granules are introduced into the chamber, said pipes being curved at their upper ends so that the gaseous agent is forced out therefrom into the chamber in a rotary motion whereby any entrained solid material separates out by centrifugal action.

5. Apparatus for contracting solid particle material and a gaseous agent for a treatment at closely controlled elevated temperatures comprising a chamber so constructed that said particle material may be flowed downwardly through said chamber during the treatment, said chamber being of sufficient length in the direction of flow to permit proper treating time, means to flow said gaseous agent through the said chamber in direct contact with said particles, heat conducting walls disposed in said chamber in such manner as to define passage means whereby a liquid heat transfer medium may be flowed through said chamber in indirect heat exchange with said particles throughout the entire portion of said chamber wherein said particles engage in said treatment, the structure and positioning of said heat conducting walls being such that each particle throughout its entire treatment period as it flows through said chamber is within sufficiently close proximity to said passage means that the temperature of all particles while in said chamber may be maintained within a suitable treating range while preventing any deleterious temperature occurring, means to flow liquid heat transfer medium through said passage means, means to properly control the temperature of said liquid heat transfer medium, and a plurality of baffle means comprising layers of perforated angle irons disposed substantially throughout the length of said treating portion of the chamber, said plurality of baffle means extending substantially across the chamber transversely to the direction of gas flow in the area not occupied by said defined passage means and being disposed in such manner that said particles may flow through the chamber over the baffles and be redistributed thereby throughout their treating period with tortuous, continuous, substantially particle-free passages being formed through said chamber which permit substantially all the gaseous agent to pass therethrough and be in direct contact with the particles along at least one edge of the passages.

6. Apparatus for contacting solid particle material and a gaseous material for a treatment at closely controlled elevated temperatures comprising a chamber so constructed that said particles may be flowed through said chamber during the treatment, said chamber being of sufficient length in the direction of flow to permit proper treating time, means to flow said gaseous agent through the said chamber in direct contact with said particles, heat conducting walls disposed in said chamber in such manner as to define passage means whereby a liquid heat transfer medium may be flowed through said chamber in indirect heat exchange with said particles throughout substantially the entire portion of said chamber wherein said particles engage in said treatment, the structure and positioning of said heat conducting walls being such that each particle throughout its entire flow through said portion of said chamber is in sufficiently close proximity to said passage means for said liquid heat transfer medium that the temperature of all particles while in said portion may be maintained within a suitable treating range while preventing any deleterious temperature occurring, means to flow liquid heat transfer medium through said passage means, means to properly control the temperature of said liquid heat transfer medium, and a plurality of baffle means disposed substantially throughout the treating portion of the chamber, all of said baffles being located so that the particles may flow through said chamber and be distributed by the baffles in such manner that substantially all of the gaseous agent may pass through the chamber in direct contact with the particles without having to pass through any portions of particles of substantial depth wherein the particles are not baffled to facilitate gaseous agent flow.

7. Apparatus for contacting solid particles and a gaseous agent for a treatment at closely controlled elevated temperatures comprising a chamber so constructed that said particles may be flowed through said chamber during the treatment, said chamber being of sufficient length in the direction of flow to permit proper treating time, means to flow said gaseous agent countercurrently through said chamber in direct contact with said particles, a plurality of tubular members positioned within said chamber and adapted to carry a flowing liquid heat transfer medium in indirect heat transfer relationship with said particles, the structure and positioning of said tubular members being such that each particle during its entire treating period is within sufficiently close proximity to at least one of said tubular members that the temperature of all particles may be maintained within a suitable treating temperature range while preventing any deleterious temperature occurring, means to flow liquid heat transfer medium through said tubular members, means to properly control the temperature of said liquid heat transfer medium, and a plurality of baffle means disposed substantially throughout the length of said treating portion of the chamber, said plurality of baffle means extending substantially across the chamber transversely to the direction of gas flow in the area not occupied by said tubular members, the plurality of baffle means being disposed in such manner as to force substantially all particles and gaseous agent flowing through the chamber to take a baffled tortuous path therethrough.

8. Apparatus for contacting solid particle material and a gaseous agent for a treatment at closely controlled elevated temperatures comprising a chamber so constructed that said particles may be gravitated through said chamber during the treatment, said chamber being of sufficient length in the direction of flow to permit proper treating time, means to flow said gaseous agent countercurrently through said chamber in direct contact with said particles, a plurality of tubular members positioned within said chamber and adapted to carry a flowing liquid heat transfer medium in indirect heat transfer relationship with said particles, the structure and positioning of said tubular members being such that each particle during its entire treating period is within sufficiently close proximity to at least one of said tubular members that the temperature of all particles may be maintained within a suitable treating temperature range while preventing any deleterious temperature occurring, means to flow liquid heat transfer medium through said tubular members, means to control the temperature of said liquid heat transfer medium so that the medium at all points in said portion of the chamber is at about the desired treating temperature, and a plurality of baffle means disposed in said portion of the chamber which plurality of baffle means extend substantially across the chamber transversely to the direction of gas flow in the area not occupied by said tubular members, the plurality of baffle means being disposed in such manner that said particles may flow through the chamber over the baffles and be distributed thereby throughout the treating period with tortuous, continuous, substantially particle-free passages being formed upwardly through said chamber for substantially all of said gaseous agent which permits the gaseous agent therein to be in direct contact with the particles along at least one edge of the particle-free passages.

9. Apparatus for increasing the efficiency of petroleum refining adsorbent particles such as clays and the like by treatment with a gaseous agent at closely controlled elevated temperatures comprising a chamber so constructed that said particles may be flowed through said chamber during treatment, said chamber being of sufficient length in the direction of flow to permit proper treating time, means to flow said gaseous agent countercurrently through said chamber in direct contact with said particles, a plurality of tubular members positioned within said chamber and adapted to carry a flowing liquid heat transfer medium in indirect heat transfer relationship with said particles, the structure and positioning of said tubular members being such that each particle during its entire treating period is within sufficiently close proximity to at least one of said tubular members that the temperature of all particles may be maintained within a suitable treating temperature range but below any temperature which causes substantial damage to the particles, means to circulate liquid heat transfer medium through said tubular members, means to maintain the temperature of all the heat transfer medium in the chamber above the temperature at which undesirable cooling occurs but below temperatures which substantially damage the particles, and a plurality of baffle means disposed substantially throughout the length of said chamber, said plurality of baffle means extending substantially across the chamber transversely to the direction of gas flow in the area not occupied by said tubular members, all baffles being located so that substantially all the particles and gaseous agent may flow through the chamber and be distributed in such manner that the gaseous agent may pass through said portion of said chamber in direct contact with said particles at a feasible treating rate without appreciably disturbing the general direction of flow of the particles.

10. Apparatus for regenerating granular adsorbent material such as clays and the like with a gaseous regenerating agent at closely controlled elevated temperatures comprising a chamber so constructed that said granular material may be gravitated through said chamber during regeneration, said chamber being of sufficient length in the direction of flow to permit proper regenerating time, means to flow said gaseous agent countercurrently through said chamber in direct contact with said granules, a plurality of tubular members positioned within said chamber and adapted to carry a circulating liquid heat transfer medium in indirect heat transfer relationship with said granules, the structure and positioning of said tubular members being such that each granule during its entire regenerating period is not more than about 1½ inches from at least one of said tubular members whereby the temperature of all granules may be maintained within a suitable regenerating temperature range while preventing any deleterious temperature occurring, means to circulate liquid heat transfer medium through said tubular members, means to maintain the temperature of all the heat transfer medium in the chamber above inefficient regeneration temperatures and below the minimum temperature which substantially damages the particles, and a plurality of baffle means disposed substantially throughout the length of said chamber, said plurality of baffle means extending substantially across the chamber transversely to the direction of gas flow in the area not occupied by said tubular members, and all baffles being located so that the granules may flow through the chamber and be distributed in such manner that substantially all of the gaseous agent may pass through the chamber in direct contact with the particles without having to pass through any portions of particles of substantial depth wherein the particles are not baffled to facilitate gaseous agent flow.

11. Apparatus for regenerating spent petroleum percolation clays by burning with air comprising a chamber so constructed that said spent clay may be flowed through said chamber during regeneration, said chamber being of sufficient length in the direction of flow to permit proper regenerating time, means to flow air countercurrently through said chamber in direct contact with said particles, a plurality of tubular members positioned within said chamber and adapted to carry a circulating molten salt heat transfer medium in indirect heat transfer relationship with said clay particles, the structure and positioning of said tubular members being such that each clay particle during its entire regenerating period is not more than about 1½ inches from at least one of said tubular members whereby the temperature of all particles may be maintained within a suitable regenerating temperature range while preventing any deleterious temperature occurring, means to circulate molten salt heat transfer medium in a circuit through said tubular members, means to cool said molten salt in said circuit so as to maintain its temperature in the chamber above temperatures at which inefficient combustion results and below the minimum temperature at which the clay particles are substantially damaged, and a plurality of baffle means disposed substantially throughout the length of said chamber, said plurality of baffle means extending substantially across the chamber transversely to the direction of gas flow in the area not occupied by said tubular members, and all baffles being located so that the clay particles and air may flow through said chamber and be distributed thereby in such manner that substantially all of the air may pass in a tortuous path up through the chamber in direct contact with the particles without having to pass through any portions of particles of substantial depth wherein the particles are not baffled to facilitate air flow.

12. Apparatus for regenerating spent petroleum percolation clays comprising a chamber so constructed that the spent clay particles may be flowed down through said chamber during regeneration, means to flow air countercurrently through said chamber, said chamber being of sufficient length in the direction of flow to permit proper regenerating time, means constructed of heat conducting material distributed throughout said chamber adapted to convey a liquid heat transfer medium within about 1½ inches of, but out of contact with, each and every particle throughout their entire presence in the portion of said chamber within they undergo regeneration so that each particle while therein may be maintained within a suitable treating temperature range without any deleterious temperature occurring, means to circulate liquid heat transfer medium through said distributed means, means to extract heat from said circulating liquid heat transfer medium during regeneration so as to maintain its temperature at all points in said portion of the chamber above inefficient combustion temperatures and below clay-damaging temperatures, and a plurality of baffle means disposed substantially throughout the length of said chamber and which plurality of baffle means extend substantially across the chamber transversely to the direction of gas flow in the area not occupied by said distributed means, and all baffles being disposed so that said clay particles may flow through the chamber and be distributed by the baffles with tortuous, substantially continuous particle-free passages being formed upwardly through said chamber through which substantially all of said air may flow through the chamber and be in direct contact with the clay particles along at least one edge of the passages.

JOHN W. PAYNE.

CERTIFICATE OF CORRECTION.

Patent No. 2,226,578. December 31, 1940.

JOHN W. PAYNE.

It is hereby certified that error appears in the printed specification of the above numbered patent requiring correction as follows: Page 7, first column, line 60, claim 3, for the word "intimate" read --direct--; same page, second column, line 42, claim 4, for "member is at" read --members at--; line 66, claim 5, for "contracting" read --contacting--; page 9, second column, line 62, claim 12, for the word "within" read --wherein--; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.